UNITED STATES PATENT OFFICE.

CHARLES MILLER, OF INGERSOLL, ONTARIO, CANADA.

MIXED PAINT.

SPECIFICATION forming part of Letters Patent No. 328,857, dated October 20, 1885.

Application filed June 15, 1885. Serial No. 168,745. (Specimens.)

*To all whom it may concern:*

Be it known that I, CHARLES MILLER, of Ingersoll, county of Oxford, and Province of Ontario, Canada, have invented a new and useful Improvement in Paints; and I declare the following to be a full, clear, and exact description of the same, such as will enable others skilled in the art to which it pertains to make and use it.

My invention consists of a paint composed of the ingredients hereinafter specified and claimed.

To make one hundred gallons of my paint I take forty to fifty gallons of gloss, gum, or resinous oil; ten to fifteen gallons of linseed-oil; ten to fifteen gallons of silicate-of-soda solution. I then mix thoroughly. Then take for body from seventy-five to one hundred pounds of Prince's metallic or other pulverized iron ore, fifty to seventy-five pounds of Rossie red ore, and fifty to seventy-five pounds of Cookson or other Venetian red. Then mix thoroughly. I then take about two gallons of potash solution, about one gallon copperas solution, one to two gallons of sal-soda solution, one to two gallons of alum solution, four to eight gallons of white-lime solution, and two to three gallons of "Lightning Drier." Then mix thoroughly. The paint is then ready to be ground in a paint-mill. After being thus thoroughly ground and incorporated it is ready for use.

I have found that it is of importance that the solutions above referred to should be within certain degrees test. Thus the silicate-of-soda solution should be made from, say, fifty gallons of water and two to five pounds of silicate of soda in the form of thick sirup, so as to make a solution to range between 1° and 15° test.

To make the potash solution, take fifty gallons of water, to which add five to fifteen pounds of potash, so that the solution will range between 1° and 15° test.

To make the copperas solution, take fifty gallons of water, to which add seventy to eighty pounds of powdered copperas, so that the solution shall range between 5° and 15° test.

To make the sal-soda solution, take fifty gallons of water, to which add ninety to one hundred pounds of powdered sal-soda, so that the solution shall range between 6° and 18° test.

To make the alum solution, take fifty gallons of water, to which add one hundred to one hundred and ten pounds of powdered alum, so that the solution shall range between 4° and 12° test.

To make the white-lime solution, take fifty gallons of water, to which add seven to ten pounds of white stone lime, so that the solution shall range from 3° to 9° test.

I prefer in each case that the solutions thus made shall each, after being thoroughly stirred, be permitted to stand about ten hours before using. Paraffine oil or other oil of a cutting nature may be added, if desired, while the ingredients are being mixed, which will cause the paint to flow more freely under the brush. These ingredients need not all be employed in the same paint, although I prefer to employ them all as stated. The resulting paint in that case is a fire and water proof article of excellent quality; but the copperas solution, sal-soda solution, and alum solution may sometimes be omitted, since their principal purpose is to add to the fire-proof quality of the paint. It is also apparent that the Prince's metallic, the Rossie red, and Venetian red may also be dispensed with and other similar body ingredients be employed. These particular ingredients, however, are well known for this purpose, and are the ones I would usually employ. So, also, the gloss, gum, or resinous oil and linseed-oil might be displaced and other oils be employed in their stead without departing materially from my invention. These oils, however, in the proportions named, form a cheap oleaginous ingredient very effectual for the purpose. When the solution of lime is added as the final ingredient, the whole mass quickly thickens up and assumes body and consistence. My paint may, therefore, assume two distinct conditions: first, that in which there appear the oil, silicate-of-soda solution, and body and color ingredients, potash solution, and solution of lime, with the fire-proof ingredients—to wit, the copperas solution, sal-soda solution, and alum solution; and, second, a condition in which there are present the same ingredients without the said fire-proof ingredients.

The material designated as "Prince's metallic" is a substance by that name found in the market, composed of seventy-two per cent. of oxide of iron and twenty-eight per cent. of hydraulic cement or carbonate of lime.

The material designated as "Rossie red" is possessed of the following ingredients: 65.80 per cent. sesquioxide of iron, 21.90 per cent. insoluble silicious residue, 5.71 per cent. lime, 2.95 per cent. magnesia, 3.64 per cent. carbonic acid, sulphur, phosphorus, &c., and is produced by what is known as "red Rossie iron ore," obtained in the Lake Superior region.

The material known as "Lightning Drier" is an article of commerce, composed of the following ingredients: one gallon raw linseed-oil, one-half pound b'ack oxide of manganese, three-fourths pound red lead, three-fourths pound litharge, one pound kauri-dust, and five gallons benzine.

What I claim is—

1. A paint composed of the following ingredients: gloss, gum, or resinous oil, linseed-oil, silicate of soda, Prince's metallic, Rossie red, Venetian red, potash, copperas, sal-soda, alum, and white lime, substantially as described.

2. A paint composed of the following ingredients: gloss, gum, or resinous oil, linseed-oil, silicate of soda, Prince's metallic, Rossie red, Venetian red, solution of potash, and solution of white lime, substantially as described.

In testimony whereof I sign this specification in the presence of two witnesses.

CHARLES MILLER.

Witnesses:
  M. B. O'DOGHERTY,
  JNO. E. WILES.